UNITED STATES PATENT OFFICE.

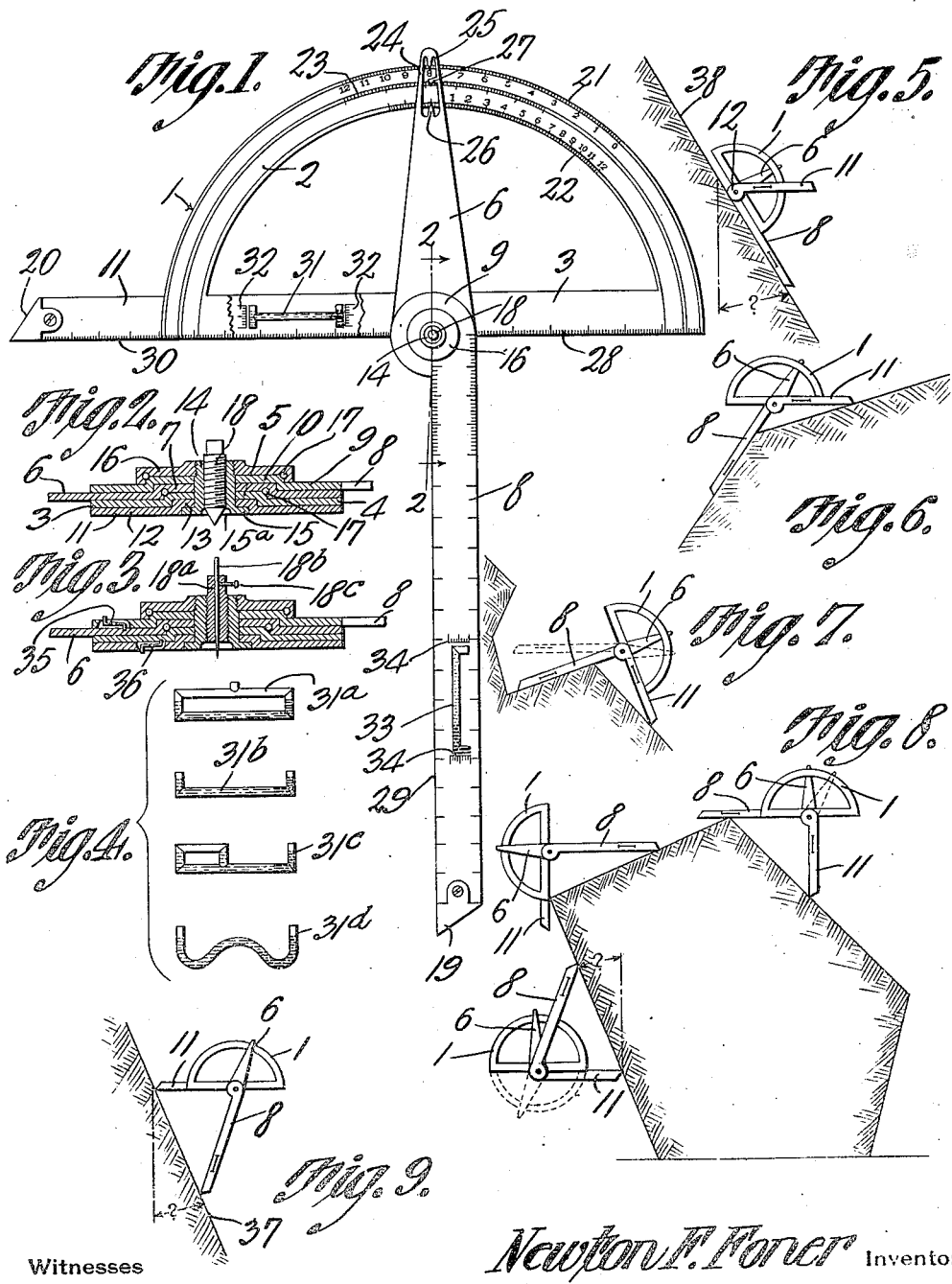

NEWTON F. FONER, OF PITTSBURGH, PENNSYLVANIA.

MEASURING INSTRUMENT.

1,128,673.	Specification of Letters Patent.	Patented Feb. 16, 1915.

Application filed July 25, 1914. Serial No. 853,231.

*To all whom it may concern:*

Be it known that I, NEWTON F. FONER, a citizen of the United States, residing at Pittsburgh, in the county of Allegheny and State of Pennsylvania, have invented a new and useful Measuring Instrument, of which the following is a specification.

The present invention appertains to measuring instruments, and aims to provide a novel device of that character adapted for use by engineers, masons, pattern makers, machinists, draftsmen, structural workers, and other artisans, for divers purposes arising in the line of their professions.

The present invention contemplates the provision of a measuring instrument embodying a unique assemblage of component parts, whereby the device will be effectively instrumental in measuring and laying out angles or bevels for various purposes, and whereby various angles or ratios of inclined surfaces may be measured or laid out with precision.

With the foregoing general objects outlined, and with other specific objects in view, which will be understood as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in the accompanying drawing, wherein:—

Figure 1 is a plan view of the measuring instrument, a portion thereof being broken away. Fig. 2 is an enlarged sectional detail taken on the line 2—2 of Fig. 1. Fig. 3 is a view similar to Fig. 2, and illustrating certain modifications or variations. Fig. 4 is a view illustrating several forms of levels which may be employed upon the measuring instrument. Figs. 5 to 9, inclusive illustrate on a reduced scale and more or less diagrammatically, various uses to which the instrument may be put in practice.

In carrying out the present invention, the instrument embodies a D-shaped stock or frame 1, which includes the respective curved and straight portions 2 and 3 which have their terminal portions integrally united. The stock or body 1 is flat and constructed of sheet metal or other suitable material, and the straight portion 3 is provided with an ear or lobe 4 projecting from its outer edge intermediate its ends, as seen in Fig. 2, and as will be evident by reference to Fig. 1. The central portion of the straight bar 3 of the stock 1 and the ear or lobe 4 thereof have struck or punched up therefrom, a circular cup or dished boss 5, the center of which lies in the line running along the outer edge of the bar 3.

A flat tapered indicating or pointer arm 6 has its butt or largest end resting snugly upon the central portion of the bar 3 and the ear 4, and the said end portion thereof is provided with an upstruck or offset cup or dished boss 7 fitting snugly and concentrically over the boss 5 of the stock. The arm 6 is disposed radially with respect to the stock 1, so that the median line of the arm intersects the center or axes of the bosses 5 and 7. The free end portion of the arm 6 overlaps the curved bar or portion 2 of the stock and is arranged to move snugly thereon.

A relatively long arm or blade 8 is provided at its butt or inner end, with a circular portion or disk 9 resting snugly on the butt or basal end of the arm 6, and equipped with an upstruck cup or dished boss 10 fitting snugly and concentrically over the boss 7, whereby the stock 1, and the arms 6 and 8 may swing around a common axis, as will be evident.

A relatively short arm or blade 11 is disposed below the stock 1, and is provided at its butt or inner end with a circular or disk portion 12 resting snugly against the bottom of the bar 3 and its ear 4 and provided with an upstruck cup or dished boss 13 fitting snugly and concentrically within the boss 5 of the stock.

As a means for holding the stock and arms in operative relation, a tubular pivot member 14 is engaged through central apertures provided in the bosses 13, 5, 7 and 10, and is provided with a head or flange 15 at one end fitting snugly within the boss 13 flush with the lower or outer surface of the disk or portion 12 of the arm 11. The head or flanged end of the pivot member 14 is provided with a recess 15$^a$ surrounding the corresponding end of the bore of the member 14. A cap 16 is threadedly engaged upon the other or upper end of the member 14 and fits snugly over the boss 10 of the arm or blade 8, and whereby the head or flange 15 of the member 14 and the said cap 16 will hold the bosses 13, 5, 7 and 10 in nested and pivotal relation. The nested bosses will in themselves retain the stock and arms in pivotal relation, as well as the pivot member, to thereby retain the stock and arms in proper operative relation at all times.

In order to enable the arm 8 to move freely with respect to the cap 16, and to enable the arm 6 to move freely with respect to the stock, an annular series of ball-bearings 17 are disposed between the complementary corner portions of the cap 16 and boss 10 and between the complementary corner portions of the bosses 7 and 5, the said corner portions being provided with annular ball races to this end. Thus, the ball-bearings 17 will reduce the friction between the arm 8 and the cap 16, and between the arm 6 and the stock 1, although the arms 6 and 8 will have a frictional engagement to tend to swing as a unit, although they may be swung with respect to one another when desired.

A centering screw 18 is threadedly engaged through the pivot member 14 and has its tip projecting slightly from the recess 15$^a$ so as to be engageable with a stone, wood or other similar surface, when the instrument is employed in a work shop, or the like.

Fig. 3 illustrates a modification or variation inasmuch as the screw 18$^a$ which is threaded through the tubular member 14 is not provided with a tip, but a needle 18$^c$ is slidable through the screw 18 and is provided with a projecting tip for engaging the drawing or drafting board when the instrument is used in the drawing room or the like. The needle 18$^b$ is adjustably secured in place by means of a set screw 18$^c$ carried by the headed end of the screw 18$^a$.

The free or outer ends of the arms or blades 8 and 11 are equipped with detachable wear tips 19 and 20, respectively, which are pointed, and which may be replaced when they become worn after continued use.

The curved bar or portion 2 of the stock 1 is provided along its outer edge with a scale of graduations 21, which in the present instance, are adapted to indicate the number of inches of inclination per foot from a vertical line, as will hereinafter more fully appear. The bar or portion 2 is further provided along its inner edge with a scale 22 graduated for certain uses of the instrument, and the bar or portion 2 is still further provided with a protractor scale 23 intermediate the scales 21 and 22. The scales 21, 22 and 23 may be provided, and preferably are, upon both sides of the bar 2. The free end portion of the arm 6 is equipped with an opening 24 through which the scales 21, 22 and 23 are exposed, and the said arm is further provided with pointers 25 and 26 projecting from the outer and inner ends of the opening 24 and coöperating with the graduations of the outer and inner scales 21 and 22, respectively. The arm 6 has a third pointer 27 projecting from one side of the opening 24 and coöperating with the protractor scale 23, to indicate the angularity of the arm 6 with respect to the stock 1, as will be obvious to those versed in the art.

The outer edge of the bar or portion 3 of the stock is preferably graduated in inches or other units of measurement, and intersects the axis of the pivot member 14. One edge of the arm or blade 8 forms a straight edge 29 which lies in a line intersecting the axle of the pivot member 14 or extending radially from the said axis. One edge of the arm or blade 11, designated 30, lines on a line intersecting or extending radially from the axis of the pivot member 14, and the said edge of the arm 11 is also preferably graduated similar to the straight edge 28 of the stock 1. The edges of the arm or blade 8 are also preferably graduated according to the unit of graduations of the bar 3 and arm or blade 11. The points of the tips 19 and 20 of the arms 8 and 11 respectively, are in alinement with the straight edges 29 and 30 of the respective arms, as clearly seen in Fig. 1.

The arm or blade 11 is equipped with a liquid level 31 which is in the form of a glass or transparent tube having terminal receptacles and which is preferably embedded in the arm 11 so as to be visible from both sides. The tube of the liquid level 31 has confined therein two liquids having different specific gravities, and which liquids are disposed at the opposite ends of the liquid level tube, whereby when the arm or blade 11 is disposed in a true horizontal position, the levels of the two liquids within the terminal portions or receptacles of the liquid level tube will indicate the horizontal position of the arm or blade 11 upon the scales 32 provided upon the said arm or blade. One or both ends of the liquid level tube are closed, whereby the levels of the liquids will be determined by the air pressure within the liquid level tube, as will be obvious to those versed in the art.

In Fig. 4, there is depicted various forms of liquid level tubes, as designated by the reference characters 31$^a$, 31$^b$, 31$^c$, and 31$^d$. These and other forms of liquid level tubes may be employed according to the circumstances.

The arm or blade 8 is similarly provided with a liquid level 33 embodying a tube preferably embedded within the arm 8 to be visible from both sides, and containing two liquids of different specific gravities, so that the levels of the liquids within the terminal portions or receptacles of the liquid level tube will indicate the position of the arm or blade 8 upon the scales 34 provided upon the said arm. Thus, the liquid level 33 will facilitate the positioning of the arm or blade 8 to a true horizontal position.

In Fig. 3, there is denoted by the numeral 35, a suitable means for locking or securing the disk or butt end 9 of the arm 8 at various angular positions with respect to the arm 6, and the numeral 36 designates similar means carried by the disk or butt end 12 of the arm 11 for holding the said arm at various angular positions with respect to the stock when desired. The holding means or devices 35 and 36 may be employed for positively holding the arms 8 and 6 in position with respect to one another, and for holding the arm 11 in position with respect to the stock, although ordinarily the frictional engagement between the said parts will hold them in place relative to one another.

The present instrument may be utilized in a large number of ways. One or two uses of the instrument will be described, and other uses and capabilities will then be obvious to those skilled in the art and to the user. The uses of the instrument will readily suggest themselves to the user, after he has once grasped the fundamental principles of the device. The present instrument may be employed in various professions and by various artisans or mechanics in the line of their work. It will be naturally evident without lengthy description, that the instrument may be employed, as a protractor, as a square, as a miter or bevel gage, and the like. One of the salient or cardinal uses of the instrument is to lay out or determine angular or inclined surfaces.

To measure the inclined surface 37 in Fig. 9, or to determine the inclination in inches per foot from the vertical, of the surface 37, the tips 19 and 20 of the arms 8 and 11 respectively, are placed against the surface 37 and the arm 11 is then adjusted to a true horizontal position through the medium of the level 31. The arm 6 which has been previously set in alinement with the straight edge 29 of the arm 8, will then indicate the measurement desired, inasmuch as the pointer 25 will indicate upon the scale 21, the number of inches of inclination per foot from the vertical of the surface of plane 37. It is evident that various means may be employed for swinging the arm 6 in alinement with the straight edge 29 of the arm or blade. It is to be understood in making the foregoing measurement, that the straight edge 28 of the stock 1 must be brought into alinement or flush with the straight edge 30 of the blade 11 to bring the stock to a true horizontal position.

Supposing it is desired to determine the angle in degrees of the inclined surface 38 illustrated in Fig. 5, then, the arm or blade 8 is swung so that its straight edge 29 is in alinement with the straight edge 28 of the stock 1, and the other edge of the arm 8 is then seated upon the surface 38. The arm or blade 11 is then brought to a horizontal position through the medium of the level 31, and consequently, the straight edge 30 of the arm 11 will indicate upon the protractor scale, the number of degrees of inclination of the surface 38. Various other uses of the instrument will be obvious from Figs. 6, 7 and 8, it being noted that Fig. 7 illustrates how the instrument may be utilized for core work or for recesses and cavities.

When the instrument is employed by masons, or is otherwise subject to hard or rough usage, the centering screw 18 is preferably employed, while when the instrument is employed in the drafting room, or the like, the centering needle or pin 18$^b$ is preferably employed to insure of accuracy in the positioning of the stock 1 on the drawing or the like. It is also to be noted that the pointer or indicating arm 6 may be adjusted angularly relative to the arm or blade 8 for certain uses of the instrument, for example, in Fig. 5, wherein the arm 6 is arranged at right angles to the arm or blade 8, to indicate upon the protractor scale, the accurate position of the stock 1 and the arm or blade 8 with respect to one another.

The pointers 25, 26 and 27 coöperating simultaneously with the scales 21, 23 and 22, respectively, will serve as a check in reading the measurements, and the graduations on the edges 28, 29 and 30 also being readable in certain uses of the implement as suggested in Figs. 5 to 9, will also serve as a further check.

From the foregoing, taken in connection with the drawing, it is believed that the various advantages and attributes of the present invention will be obvious to those versed in the art, and further comment is not deemed necessary.

Having thus described the invention, what is claimed is:—

1. In a measuring instrument, a graduated stock, and three arms pivotally engaged thereto to swing about a common axis, the stock having a straight edge intersecting the said axis, a pair of the arms each having a straight edge intersecting the said axis, and the other arm being adapted to be moved with one of the said arms having the straight edges, and coöperable with the graduations of the stock.

2. In a measuring instrument, a graduated stock, three arms pivotally engaged thereto to swing about a common axis, levels carried by a pair of the said arms, and the other arm being adapted to be moved with and to be set at various angular positions relative to one of the said pair of arms and coöperating with the graduations of the stock.

3. In a measuring instrument, a stock, three arms pivotally engaged thereto to swing about a common axis, the stock having graduations and a straight edge intersecting the said axis, levels carried by a pair of the said arms, the said pair of arms each having a straight edge intersecting the axis, the other arm coöperating with the graduations and being adapted to be moved with and set at various angular positions relative to one of the aforesaid pair of arms.

4. In a measuring instrument, a plurality of members having nested dished bosses, a pivot element engaged centrally through the said bosses and having a head at one end seated within one boss, and a cap engaged to the other end of the pivot element and fitting over the corresponding boss.

In testimony that I claim the foregoing as my own, I have hereto affixed my signature in the presence of two witnesses.

NEWTON F. FONER.

Witnesses:
HANS H. SCHMID,
A. FREDRIK NORDENSKJOLD.